United States Patent
Harsha et al.

(10) Patent No.: US 12,307,333 B2
(45) Date of Patent: May 20, 2025

(54) LOSS AUGMENTATION FOR PREDICTIVE MODELING

(71) Applicant: INTERNATIONAL BUSINESS MACHINES CORPORATION, Armonk, NY (US)

(72) Inventors: Pavithra Harsha, White Plains, NY (US); Brian Leo Quanz, Yorktown Heights, NY (US); Shivaram Subramanian, Frisco, TX (US); Wei Sun, Tarrytown, NY (US); Max Biggs, Charlottesville, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1128 days.

(21) Appl. No.: 17/135,920

(22) Filed: Dec. 28, 2020

(65) Prior Publication Data

US 2022/0207413 A1 Jun. 30, 2022

(51) Int. Cl.
*G06N 20/00* (2019.01)
*G06F 18/21* (2023.01)
*G06F 18/2132* (2023.01)
*G06F 18/214* (2023.01)

(52) U.S. Cl.
CPC ....... *G06N 20/00* (2019.01); *G06F 18/21322* (2023.01); *G06F 18/214* (2023.01); *G06F 18/217* (2023.01); *G06F 18/21326* (2023.01)

(58) Field of Classification Search
CPC . G06N 20/00; G06N 5/01; G06N 3/08; G06F 18/21322; G06F 18/214; G06F 18/217; G06F 18/21326
See application file for complete search history.

(56) References Cited

U.S. PATENT DOCUMENTS

| | | | |
|---|---|---|---|
| 5,002,313 A | 3/1991 | Salvatore | |
| 7,072,852 B1 | 7/2006 | Kamille | |
| 7,451,123 B2 * | 11/2008 | Platt | G06F 18/24147 706/20 |

(Continued)

OTHER PUBLICATIONS

Chen, J. T. et al., "Wide & Deep Learning for Recommender Systems", In Proceedings of the 1st Workshop on Deep Learning for Recommender Systems (2016), pp. 7-10.

(Continued)

*Primary Examiner* — Haimei Jiang
(74) *Attorney, Agent, or Firm* — Intelletek Law Group, PLLC; Gabriel Daniel, Esq.

(57) ABSTRACT

A machine learning system that incorporates arbitrary constraints into deep learning model is provided. The machine learning system provides a set of penalty data points en a set of arbitrary constraints in addition to a set of original training data points. The machine learning system assigns a penalty to each penalty data point in the set of penalty data points. The machine learning system optimizes a machine learning model by solving an objective function based on an original loss function and a penalty loss function. The original loss function is evaluated over a set of original training data points and the penalty loss function is evaluated over the set of penalty data points. The machine learning system provides the optimized machine learning model based on a solution of the objective function.

20 Claims, 3 Drawing Sheets

(56) References Cited

U.S. PATENT DOCUMENTS

| | | | |
|---|---|---|---|
| 8,280,768 B2 | 10/2012 | Davis | |
| 9,965,770 B2 | 5/2018 | Mason-Gugenheim et al. | |
| 11,281,969 B1* | 3/2022 | Rangapuram | G06N 7/01 |
| 2006/0224533 A1* | 10/2006 | Thaler | G06N 3/105 |
| | | | 706/15 |
| 2012/0158474 A1 | 6/2012 | Fahner et al. | |
| 2012/0330867 A1* | 12/2012 | Gemulla | G06F 17/10 |
| | | | 706/12 |
| 2013/0006738 A1 | 1/2013 | Horvitz et al. | |
| 2013/0006744 A1 | 1/2013 | Redford et al. | |
| 2013/0006750 A1 | 1/2013 | Simmons, Jr. | |
| 2013/0024261 A1 | 1/2013 | Main et al. | |
| 2013/0041737 A1 | 2/2013 | Mishra et al. | |
| 2013/0073372 A1 | 3/2013 | Novick et al. | |
| 2015/0100402 A1 | 4/2015 | Gadotti | |
| 2015/0205759 A1* | 7/2015 | Israel | G06N 10/60 |
| | | | 703/2 |
| 2017/0011416 A1 | 1/2017 | Vaysman | |
| 2017/0161640 A1* | 6/2017 | Shamir | G06N 20/00 |
| 2017/0300814 A1 | 10/2017 | Shaked et al. | |
| 2018/0107925 A1* | 4/2018 | Choi | G06F 17/16 |
| 2019/0130218 A1 | 5/2019 | Albright et al. | |
| 2019/0171908 A1* | 6/2019 | Salavon | G06V 10/82 |
| 2019/0172082 A1 | 6/2019 | Ganti Mahapatruni et al. | |
| 2019/0180303 A1 | 6/2019 | Ventrice et al. | |
| 2020/0026996 A1* | 1/2020 | Kolter | G06N 3/047 |
| 2020/0234374 A1 | 7/2020 | Bawadhankar et al. | |
| 2021/0097052 A1 | 4/2021 | Hans et al. | |
| 2021/0295175 A1 | 9/2021 | Kennel et al. | |
| 2021/0334664 A1 | 10/2021 | Li et al. | |
| 2022/0207413 A1* | 6/2022 | Harsha | G06N 5/01 |
| 2022/0230065 A1 | 7/2022 | Berthelot | |
| 2022/0366218 A1 | 11/2022 | Parisotto et al. | |
| 2023/0141655 A1 | 5/2023 | Gonzalez et al. | |
| 2023/0154055 A1* | 5/2023 | Besenbruch | H04N 19/91 |
| | | | 375/240.03 |
| 2023/0385603 A1 | 11/2023 | Arikawa et al. | |

OTHER PUBLICATIONS

Bedi, J. et al., "Deep Learning Framework to Forecast Electricity Demand"; Applied Energy (2019); vol. 238; pp. 1312-1326.

Carbonneau, R. et al., "Application of Machine Learning Techniques for Supply Chain Demand Forecasting"; European Journal of Operational Research (2008); vol. 184; pp. 1140-1154.

Ke, J. et al., "Short-Term Forecasting of Passenger Demand under On-Demand Ride Services: A Spatio-Temporal Deep Learning Approach"; arXiv:1706.06279v1 [cs.LG] (2017); 39 pgs.

Qiu, X. et al., "Empirical Mode Decomposition based Ensemble Deep Learning for Load Demand Time Series Forecasting"; Applied Soft Computing (2017); 40 pgs.

Yao, H. et al., "Deep Multi-View Spatial-Temporal Network for Taxi Demand Prediction"; The Thirty-Second AAAI Conference on Artificial Intelligence (2018); pp. 2588-2595.

List of IBM Patents or Patent Applications Treated as Related, 2 pgs.

Kilroy, J. et al., "Method and System for Exchanging and Trading Online Coupons"; IP.Com (2011); 4 pgs.

Borghesi et al., "Improving Deep Learning Models via Constraint-Based Domain Knowledge: A Brief Survey," arXiv:2005.10691v1 [cs.LG], May 19, 2020, 14 pages.

* cited by examiner

LOSS AUGMENTATION FOR PREDICTIVE MODELING

BACKGROUND

Technical Field

The present disclosure generally relates to predictive modeling.

Description of the Related Arts

Deep Learning, or DL, is a multi-layer neural network and associated with technology in Artificial Intelligence (AI), enabling many new and improved applications dominating research and applications in recent years. Deep Learning enables flexible modeling that models arbitrary underlying processes more accurately than traditional methods. Deep Learning has enabled obtaining state-of-the-art results for a variety of predictive tasks and applications in many domains (e.g., image classification, text classification, language modeling, translation, game playing through reinforcement learning beating world champions, etc.) with less effort to design models and features.

In recent years, deep learning is also being used more frequently in applications for predictive modeling to drive processes and systems, as more and more data becomes available and desired to be included in predictive modeling to drive an industry process. Nevertheless, many obstacles remain when applying DL to real industry problems and industry behaviors involving constraints specific to different industry domains. For example, in demand planning, price is a key factor for predicting demand, and there are known relationships such as that increased price leads to decreased demand. The price-demand relationships need to be captured directly to manage multiple processes and systems such as predicting demand for different prices, e.g., for the purposes of price optimization (determining what are the optimal prices to set). On the other hand, in service workforce management, there are known relationships such as adding more workers reduces the risks of work ticket violations, having more skilled workers reduces number of workplace incidents and service time, etc.

The chief difficulty in applying DL to industry problems is that there is no way to enforce known industry constraints in the deep learning modeling and there is not enough available data to accurately learn the known behavior. Such functional constraints specific to a domain cannot be directly incorporated into DL models because DL models work by learning multi-layer neural nets, which have complex functional forms and derivatives. Incorporating domain-specific constraints may lead to a learning problem too inefficient and difficult to optimize. DL models that are more powerful and accurate often do not respect industry constraints and generalize incorrectly, leading to poor, bizarre, and incorrect decisions. For example, it is typical for deep learning and flexible machine learning standard approaches to generate unreasonable models in which demand or purchase propensity increases with increasing price. Consequently, applications often make do with weaker, less accurate models for which the constraints can be incorporated.

SUMMARY

Some embodiments of the disclosure provide a machine learning system that incorporates arbitrary constraints into deep learning models. The machine learning system provides a set of penalty data points enforcing a set of arbitrary constraints in addition to a set of original training data points. The machine learning system assigns a penalty to each penalty data point in the set of penalty data points. The machine learning system optimizes a machine learning model by solving an objective function based on an original loss function and a penalty loss function. The original loss function is evaluated over a set of original training data points and the penalty loss function is evaluated over the set of penalty data points. The machine learning system provides the optimized machine learning model based on a solution of the objective function.

The machine learning model may include a deep learning model having one or more intermediate layers. In some embodiments, the original loss function and the penalty loss function are additive terms in the objective function. In some embodiments, the machine learning system solves the objective function by performing stochastic gradient descent. The original loss function is evaluated over a set of original training data points and the penalty loss function is evaluated over the set of penalty data points.

In some embodiments, the additional data points are samples identified based on an earlier iteration of a stochastic gradient descent operation used to optimize the machine learning, and the additional data points are identified based on violation of the arbitrary constraints (e.g., the data points with the greatest violation) during the earlier iteration of the stochastic gradient descent operation. The machine learning system determines whether the maximized penalty loss function causes the objective function to be less than a threshold (e.g., the threshold is zero so the objective function is negative). If so, the machine learning system terminates optimization of the machine learning model. If the maximized penalty loss function causes the objective function to be greater than a threshold, the machine learning system updates the set of penalty data points with the additional data points and continuing to optimize the machine learning model by solving the objective function for another iteration of solving the objective function.

By modifying the training data set and the objective function of a machine learning model to incorporate penalty data points and penalty loss function, arbitrary constraints (e.g., industry constraints) and known relationships can be incorporated into deep learning. A more automatic, accurate, scalable and efficient predictive modeling system that generalizes correctly to unseen data, to drive downstream industry systems and processes is therefore realized.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
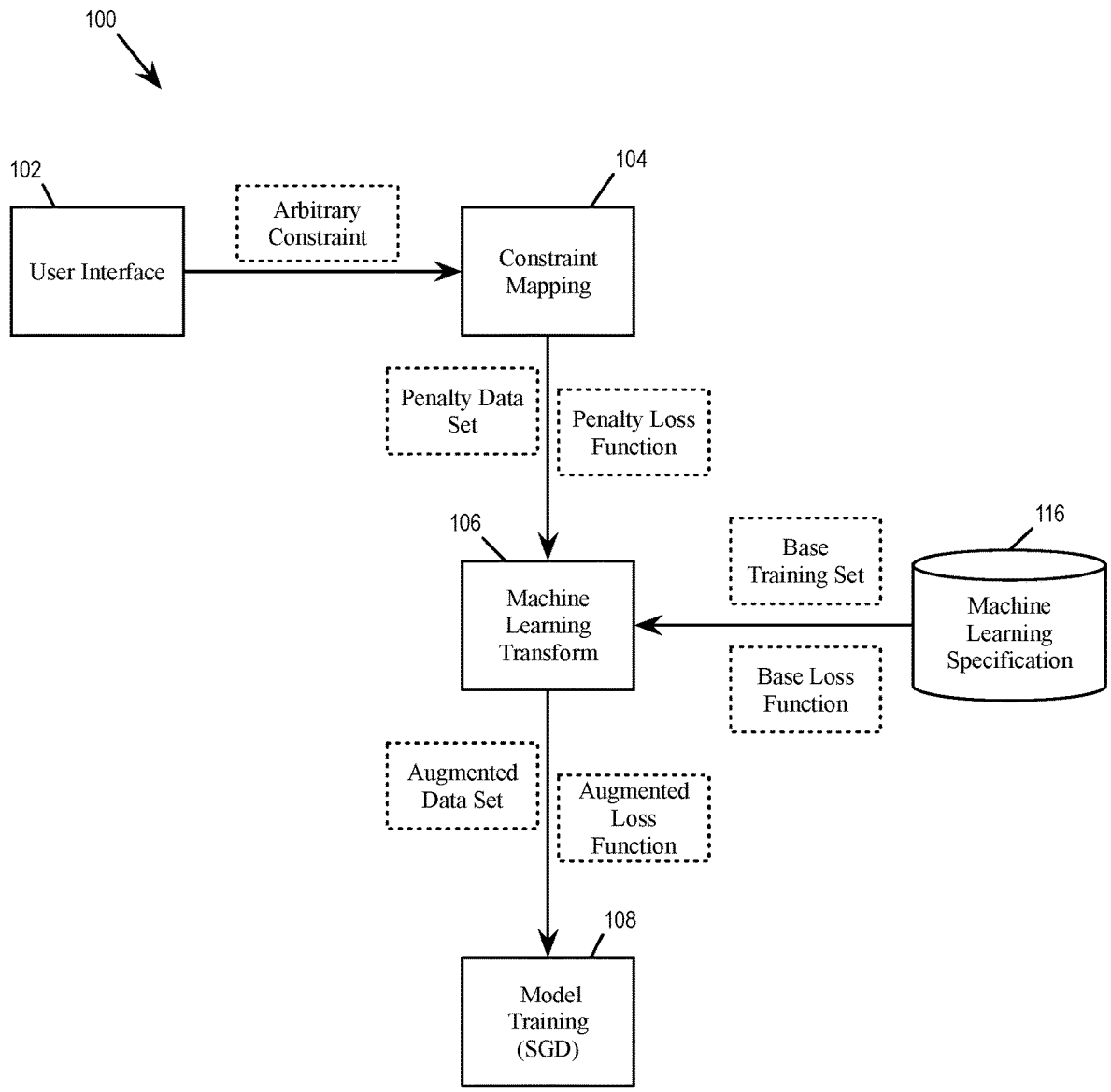
FIG. 1 illustrates a machine learning system in which a set of constraints is incorporated into a deep learning model by using loss augmentation.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

When implementing arbitrary constraints in machine learning, typically, traditional, "weaker" approaches that use simple parametric model (e.g., generalized linear) are used so constraints can be easily incorporated in learning with a modified formulation/optimization problem that can be easily solved. With linear models, many of the industry constraints often amount to simple linear constraints on the parameters so they can be efficiently learned as part of a convex or efficiently solvable non-convex optimization problem. The challenge is to implement arbitrary constraints in deep learning (DL) models so to be able to take advantage of its ability to learn complex functions from many variables but not be restricted to a fixed parametric form which may be unrealistic and do not match the underlying data.

DL functions are highly non-linear and non-convex, which includes a chain of non-linear transformations. Similarly, the derivative of a neural net model with respect to any input is also a deeply nested, highly non-linear/non-convex function. Consequently, directly applying constraints to DL as with simple models is very difficult if not impossible, as the optimization problem to be solved would then become intractable and very difficult to solve, and standard DL optimization techniques like stochastic gradient descent could no longer be used. On the other hand, in real life industry applications, constraints to capture multiple assumed behaviors are getting more and more complicated and varied such as when there are multiple different functional constraints.

In some embodiments, a loss augmentation method is used to provide the set of learning transforms necessary to implement a set of arbitrary constraints (e.g., industry constraints such as the selected domain-specific constraints and general functional relationships) in a DL machine learning model. Loss augmentation is a method that uses modified examples of inputs (e.g., random or selected via optimization) with custom losses that capture the desired functional behaviors. For each data point (or input point) in the training set (or a current batch or subset of the training set in a current model optimization iteration), additional data points are sampled and added to the training set (or the current batch), as part of the model setup or training procedure. Additional loss function component(s) may be added to the regular loss function components in the objective function of the machine learning model. The additional loss function(s) may be specified to penalize behaviors (so the additional loss function is also referred to as penalty loss function) that do not conform to the desired functional behavior and relationships according to the arbitrary constraints.

In some embodiments, during the stochastic gradient descent, a batch of the training data are randomly sampled (e.g., 20 examples/data points from the full training data set). For each sample in the batch, the system determines a set of modified example inputs to include in the loss—e.g., the most violated points that the system can find nearby under the current model parameters (neural net weights of the machine learning model). After the batch is processed, the model parameters are updated. Thus, even if the machine learning system encounters the same batch of data in the future, the most-violated points may be different at that time, or a different set of random samples will be used for determining the additional penalty loss.

For example, during stochastic gradient descent of a model with input x, z and output f(x,z), in order to enforce a constraint that f be an increasing function of x, the system running loss augmentation would provide input (x+rand,z) to obtain output f(x+rand,z), and adds a hinge loss to penalize f(x+rand,z) f(x,z), where "rand" is some positive random value. In some embodiments, the value of "rand" is explicitly chosen to maximize the violation f(x,z)–f(x+rand,z), e.g., through gradient ascent as well. As another example, to implement an arbitrary constraint on demand-price behavior, rank-enforcing losses (also referred to as hinge losses) may be added to an objective function, and additional random samples around each point are added during training to evaluate the constraint losses. Empirically, DL models with loss augmentation is able to correctly generalize the demand-price relationship, while DL models without loss augmentation cannot correctly generalize the demand-price relationship.

The loss augmentation method allows a machine learning system to be able to incorporate arbitrary functional relationships with any DL model without modifying training, gradient-based updates, and gradient computation approaches (since the gradient is also taken with respect to the added loss term). Arbitrary constraints can be incorporated with appropriate additional data inputs (that are generated on the fly based on the arbitrary functional relationships) and corresponding additional terms in loss function.

In some embodiments, a machine learning system implementing the loss augmentation method works by applying unique loss function components and data augmentation (data points that can be sampled or constructed for evaluating the model) to the training objective and the stochastic gradient descent optimization process. Functional relationships are transformed into corresponding loss functions, added to the overall objective function, and evaluated through different types of data augmentation.

In some embodiments, a Lagrange multiplier approach is used to transform arbitrary constraints into constraint losses or logic losses. These constraint losses can be used to evaluate the machine learning model at unobserved data points without the observed (true/actual) values. For example, to implement demand to price functional relationship, losses sampled or generated around each observed data point based on the Lagrange multiplier approach can be used as constraint losses for enforcing the functional relationships of higher price leading to less demand, despite not having any actual observed data for those prices. In other words, in some embodiments, to enforce a functional relationship in the machine learning model, the machine learning system may use generated data of that functional relationship rather than actual observed data of that functional relationship.

In some embodiments, the functional constraints and the constraint losses are added to the objective function (main loss function, predictive model loss function) and weighted appropriately during training or stochastic gradient descent. The functional constraints and the constraint losses are jointly optimized at the same time when optimizing the objective function, through stochastic gradient descent. In some embodiments, the optimization is performed with weighted additional loss components that may be adjusted by e.g., gradually increasing weights of constraint losses. For example, a weight much less than 1.0 may be assigned to the additional penalty loss functions, so that the original data-fitting loss function has the most impact on the overall objective function, and the weight of the penalty loss functions may be incrementally increased over training/optimization iterations to gradually increase the influence of the penalty losses enforcing the constraints on the model training.

As data points are randomly sampled during the stochastic gradient descent process, the constraint losses are also sampled to update the model parameters and to ensure correct generalization according to the functional constraints and constraint losses. In some embodiments, an inner-maximization/optimization approach is used to enhance the stochastic gradient descent process by identifying data points to include in the objective function, specifically data points that cause the constraints to be violated most (have the most constraint loss) during the stochastic gradient descent. In some embodiments, these are approximately found by solving an inner maximization problem with respect to the specific constraint loss function, e.g., using several iterations of gradient ascent where the gradient of the constraint loss is taken with respect to the input data point or variable/s, such that the result of the inner maximization is a data point or variable/s values that come close to maximizing the constraint penalty. In some embodiments, these are data points that deviate from expected values by more than a threshold. In some embodiments, additional samples of training data are generated for each functional relationship component (a set of domain-specific constraints or general functional relationships) during the stochastic gradient descent process. In some embodiments, samples that are identified as key samples are included in the stochastic gradient descent process. In some embodiments, only a subset of the previously identified penalty data points are included in each iteration, and in some embodiments, only the latest maximum violation points are included in each iteration.

A machine learning system implementing the loss augmentation method is solving a problem:

$$\min_{\beta} E[L(f(X; \beta), Y)]; g(f(X; \beta)) \leq 0 \text{ for all } X \in \chi \quad (1)$$

In which a loss function L (of input X, target output Y, and model predicted output $f(X; \beta)$) is to be minimized while complying with constraint g in the entire domain $X \in \chi$. With N observation data samples as training set, the problem (1) can be rewritten as:

$$\min_{\beta} \sum_{i=1}^{N} L(f(x_i; \beta), y_i); g(f(X; \beta)) \leq 0 \text{ for all } X \in \chi \quad (2)$$

For example, g( ) could be the derivative, or corresponding finite difference equation, with respect to some specific variable of X, to require $f$ to decrease with increasing value of that variable across all other inputs.

In some embodiments, in order to solve (2), the Lagrange of the constraint is taken at certain sampled covariates and used as a modified loss function. Since constraint does not depend on the target variable, the system may sample in the domain of observed ranges of the covariates, or retain all the original observations and any known boundary behavior, or sample around the original observations to retain the correlations between the covariates present in the data.

The original loss function objective is modified by adding a penalty-based loss function related to constraint. Such an added penalty-based loss function may be a hinge loss or its smoothened version with a sufficiently large penalty or a log-barrier with a small penalty. The objective function (2) is modified to become:

$$\min_{\beta} \sum_{i=1}^{N} L(f(x_i; \beta), y_i) + \sum_{s=1}^{S} \lambda_s \max\{g(f(x_s, ; \beta)), 0\} \quad (3)$$

or $$\min_{\beta} \sum_{i=1}^{N} L(f(x_i; \beta), y_i) + \sum_{s=1}^{S} \lambda_s \log[-g(f(x_s, ; \beta)), 0] \quad (4)$$

There are S samples in a set of penalty data points that augments the N samples of the original training data set. In some embodiments, additional points are sampled at random or efficiently identified by solving a sub-problem:

$$\max_{x \in X} g(f(X; \beta)) \quad (5)$$

For some embodiments, FIG. 1 illustrates a machine learning system 100 in which a set of industry constraints is incorporated into a DL model by using loss augmentation. The system includes a user interface module 102, a constraint mapping module 104, a machine learning transform module 106, and a model training module 108.

In some embodiments, a computing system of one or more computing devices implement the machine learning system 100. In some embodiments, the modules 102-108 are modules of software instructions being executed by one or more processing units (e.g., a processor) of the computing devices. In some embodiments, the modules 102-108 are modules of hardware circuits implemented by one or more integrated circuits (ICs) of an electronic apparatus. Though the modules 102, 104, 106, and 108 are illustrated as being separate modules, some of the modules can be combined into a single module. For example, the functionalities of the constraint mapping module 104 can be merged into the machine learning transform module 106. An example computing device 300 that may implement the machine learning system 100 will be described by reference to FIG. 3 below.

The user interface module 102 lets users specify a set of arbitrary constraints, including functional constraints and/or relationships. In some embodiments, the user interface module 102 allows the selection of a set of domain-specific constraints from multiple different sets of domain-specific constraints (e.g., industry types), of a set of general functional relationships from multiple sets of general functional relationships. A set of domain-specific constraints can be constraints that are known to be common to a type of industry (e.g., demand should not increase if price increases). A general functional relationship specifies the mathematical or logical relationship between variables. These constraints are "general" as they may be applicable to any number of industry domains.

The user interface module 102 may provide a list of possible domains (e.g., demand planning industry, healthcare industry, workforce management industry, etc.) and a list of general functional relationships (e.g., gradient constraints, convex/concave relationships, steady state behavior, modality constraints, multi-variable relationship constraints, etc.) for the user to choose from. The user interface module 102 may also provide a list of industries for the user to choose from, and the user interface module 102 may then in turn translate the chosen industry into selections of domain-specific constraints and general functional relationships. The user interface module 102 may also allow a user to build new patterns by selecting variables and classes of relation components (domain-specific constraints and general functional relationships) or specifying parameters that are particular to the user's application.

The constraint mapping module 104 maps the arbitrary constraints to a set of penalty data points and corresponding penalties. The constraint mapping module 104 also maps the arbitrary constraints to a penalty loss function. In some embodiments, the constraint mapping module 104 uses the arbitrary constraint provided by the user interface 102 to retrieve from a constraint library 114 the set of penalty data points and the penalty loss function.

The machine learning transform module 106 modifies a machine learning specification 116 according to the set of learning transforms. In some embodiments, the machine learning specification 116 specifies a model construction, a model setup procedure, and an objective function for constructing a machine learning model. In some embodiments, the model construction of the machine learning model specifies a deep learning model having one or more intermediate layers. The machine learning transform module 106 may modify the machine learning specification 116 by transforming the model construction, the model setup procedure, and/or the loss function according to the set of learning transforms.

The machine learning transform module 106 modifies the objective function by augmenting a base loss function with the penalty loss function. The machine learning transform module 106 also modifies the model set up procedure by augmenting a training dataset that is used for setting up the machine learning model with the penalty data points. In some embodiments, the penalty loss function and the penalty data points may be provided directly by the user interface 102.

Figure 2:
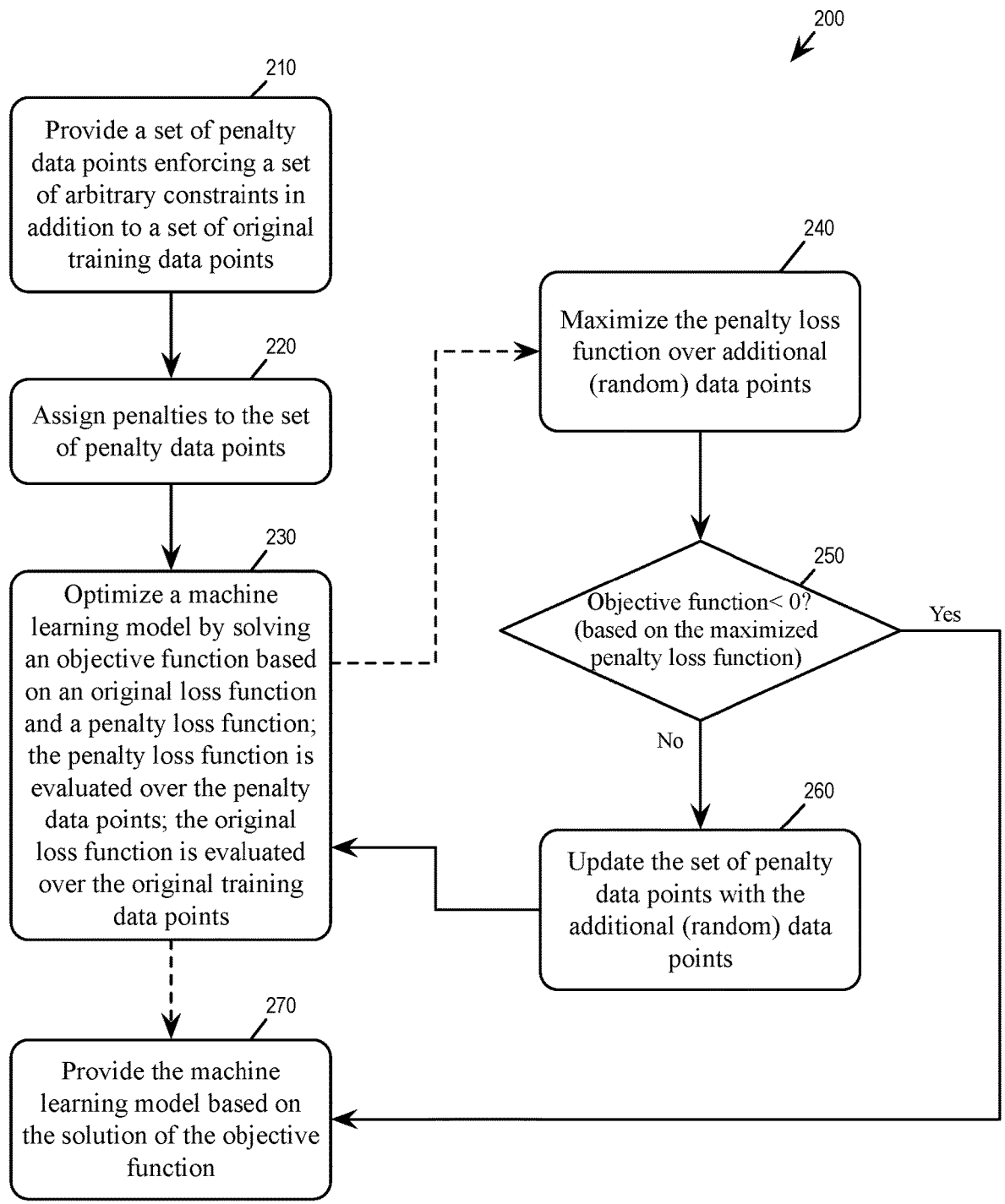
FIG. 2 conceptually illustrates a process for building a machine learning model that implements arbitrary constraints using loss augmentation, consistent with an illustrative embodiment.

FIG. 2 conceptually illustrates a process 200 for building a machine learning model that implements arbitrary constraints using loss augmentation, consistent with an illustrative embodiment. In some embodiments, one or more processing units (e.g., processor) of a computing device implementing the machine learning system 100 perform the process 200 by executing instructions stored in a computer readable medium.

The machine learning system provides (at block 210) or receives a set of penalty data points implementing or enforcing a set of arbitrary constraints in addition to a set of original training data points. The machine learning system assigns (at block 220) a penalty to each penalty data point in the set of penalty data points. The original training data points may be denoted as $x_i$, $y_i$ with $i=1, \ldots N$. The penalty data points may be denoted as $x_s$, $y_s$. The penalty of each penalty data point is denoted as $\lambda_s$.

The machine learning system optimizes (at block 230) a machine learning model by solving an objective function (e.g., by solving equation (3)) based on an original loss function (or base loss function) and a penalty loss function (or constraint violation loss function). The machine learning model may include a deep learning model having one or more intermediate layers. In some embodiments, the original loss function and the penalty loss function are additive terms in the objective function. In some embodiments, the machine learning system solves the objective function by performing stochastic gradient descent. The original loss function is evaluated over a set of original training data points and the penalty loss function is evaluated over the set of penalty data points. In some embodiments, the process proceeds to block 240 to further optimize by maximizing the penalty loss function. In some embodiments, the machine learning system terminates optimization so the process proceeds to block 270.

At block 240, the machine learning system maximizes the penalty loss function over additional data points in addition to the set of penalty data points (e.g., by solving equation (5)). In some embodiments, the additional data points are samples identified based on an earlier iteration of a stochastic gradient descent operation used to optimize the machine learning, and the additional data points are identified based on violation of the arbitrary constraints (e.g., the data points with the greatest violation) during the earlier iteration of the stochastic gradient descent (SGD) operation.

The machine learning system determines (at block 250) whether the maximized penalty loss function causes the objective function to be less than a threshold (e.g., the threshold is zero so the objective function is negative). If so, the machine learning system terminates optimization of the machine learning model (by proceeding to block 270). If the maximized penalty loss function causes the objective function to be greater than a threshold, the process proceeds to block 260.

The machine learning system updates (at block 260) the set of penalty data points with the additional data points and continuing to optimize the machine learning model by solving the objective function (by returning to block 230 for another iteration of solving the objective function). The machine learning system provides (at block 270) the optimized machine learning model based on a solution of the objective function.

A machine learning system incorporating the loss augmentation method allows any constraint or relationship to be incorporated with a corresponding set of penalty data points and penalty loss that reflects the constraint or functional relationship. The penalty loss increases as that constraint or relationship is violated, and the penalty data points are specifically and/or randomly sampled, or chosen through optimization to find the most violated data points for each constraint or relationship. Therefore, incorporating the penalty data points and the penalty loss captures expected or maximum violation of the desired constraint or relationship, so that optimizing the loss, along with the regular data-fitting loss, reduces the chance of violation for the fitted model. Furthermore, since the penalty loss is just another loss term, a typical optimization procedure for a machine model such as stochastic gradient descent can be used, where the gradient of the model parameters relative to the loss is used to update the model parameters.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 2) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
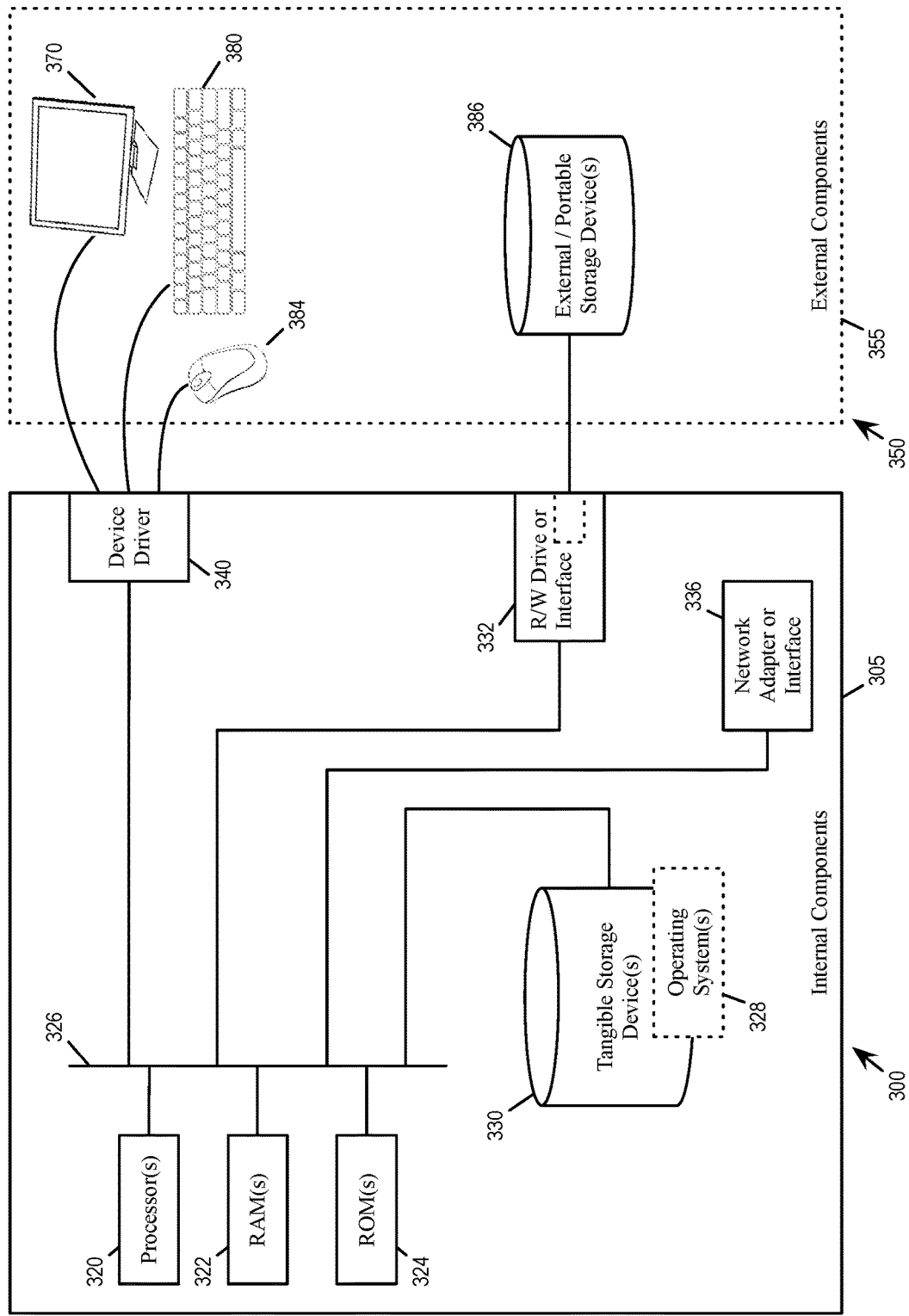
FIG. 3 shows a block diagram of the components of a data processing system in accordance with an illustrative embodiment of the present disclosure.

FIG. 3 shows a block diagram of the components of data processing systems 300 and 350 that may be used to implement a machine learning system in accordance with an illustrative embodiment of the present disclosure. It should be appreciated that FIG. 3 provides only an illustration of one implementation and does not imply any limitations with regard to the environments in which different embodiments may be implemented. Many modifications to the depicted environments may be made based on design and implementation requirements.

Data processing systems 300 and 350 are representative of any electronic device capable of executing machine-readable program instructions. Data processing systems 300 and 350 may be representative of a smart phone, a computer system, PDA, or other electronic devices. Examples of computing systems, environments, and/or configurations that may represented by data processing systems 300 and 350 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 300 and 350 may include a set of internal components 305 and a set of external components 355 illustrated in FIG. 3. The set of internal components 305 includes one or more processors 320, one or more computer-readable RAMs 322 and one or more computer-readable ROMs 324 on one or more buses 326, and one or more operating systems 328 and one or more computer-readable tangible storage devices 330. The one or more operating systems 328 and programs such as the programs for executing the process 200 are stored on one or more computer-readable tangible storage devices 330 for execution by one or more processors 320 via one or more RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

The set of internal components 305 also includes a R/W drive or interface 332 to read from and write to one or more portable computer-readable tangible storage devices 386 such as a CD-ROM, DVD, memory stick, magnetic tape, magnetic disk, optical disk or semiconductor storage device. The instructions for executing the process 200 can be stored on one or more of the respective portable computer-readable tangible storage devices 386, read via the respective R/W drive or interface 332 and loaded into the respective hard drive 330.

The set of internal components 305 may also include network adapters (or switch port cards) or interfaces 336 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 336. From the network adapters (or switch port adaptors) or interfaces 336, the instructions and data of the described programs or processes are loaded into the respective hard drive 330. The network may comprise copper wires, optical fibers, wireless transmission, routers, firewalls, switches, gateway computers and/or edge servers.

The set of external components 355 can include a computer display monitor 370, a keyboard 380, and a computer mouse 384. The set of external components 355 can also include touch screens, virtual keyboards, touch pads, pointing devices, and other human interface devices. The set of internal components 305 also includes device drivers 340 to interface to computer display monitor 370, keyboard 380 and computer mouse 384. The device drivers 340, R/W drive or interface 332 and network adapter or interface 336 comprise hardware and software (stored in storage device 330 and/or ROM 324).

The foregoing one or more embodiments implements a machine learning system by having one or more computing devices storing and/or determining the information used to transform a machine learning model for implementing the loss augmentation method, specifically penalty data points and penalty loss function. The computer infrastructure is further used to optimize a deep learning model based on the added penalty data points and penalty loss function.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
providing a set of penalty data points enforcing a set of arbitrary constraints in addition to a set of original training data points for a deep learning model;
assigning a penalty to each penalty data point in the set of penalty data points;
optimizing the deep learning model by solving an objective function based on an original loss function and a penalty loss function, wherein the original loss function is evaluated over a set of original training data points and the penalty loss function is evaluated over the set of penalty data points; and
providing the optimized deep learning model based on a solution of the objective function.

2. The computing device of claim 1, wherein optimizing the deep learning model further comprises maximizing the penalty loss function over additional data points in addition to the set of penalty data points.

3. The computing device of claim 2, wherein the set of instructions further configures the computing device to perform acts comprising: upon determining that the maximized penalty loss function causes the objective function to be greater than a threshold, updating the set of penalty data points with the additional data points and continuing to optimize the deep learning model by solving the objective function.

4. The computing device of claim 2, wherein the set of instructions further configures the computing device to perform an act comprising: upon determining that the maximized penalty loss function causes the objective function to be less than a threshold, terminating optimization of the deep learning model.

5. The computing device of claim 2, wherein the additional data points are samples identified based on an earlier iteration of a stochastic gradient descent operation used to optimize the deep learning.

6. The computing device of claim 5, wherein the additional data points are identified based on a violation of the arbitrary constraints during the earlier iteration of the stochastic gradient descent operation.

7. The computing device of claim 1, wherein the original loss function with the penalty loss function are additive terms in the objective function.

8. The computing device of claim 1, wherein the deep learning model comprises one or more intermediate layers.

9. A computer-implemented method comprising:
   providing a set of penalty data points enforcing a set of arbitrary constraints in addition to a set of original training data points for a deep learning model;
   assigning a penalty to each penalty data point in the set of penalty data points;
   optimizing the deep learning model by solving an objective function based on an original loss function and a penalty loss function, wherein the original loss function is evaluated over a set of original training data points and the penalty loss function is evaluated over the set of penalty data points; and
   providing the optimized deep learning model based on a solution of the objective function.

10. The computer-implemented method of claim 9, wherein optimizing the deep learning model further comprises maximizing the penalty loss function over additional data points in addition to the set of penalty data points.

11. The computer-implemented method of claim 10, further comprising, upon determining that the maximized penalty loss function causes the objective function to be greater than a threshold, updating the set of penalty data points with the additional data points and continuing to optimize the deep learning model by solving the objective function.

12. The computer-implemented method of claim 10, further comprising, upon determining that the maximized penalty loss function causes the objective function to be less than a threshold, terminating optimization of the deep learning model.

13. The computer-implemented method of claim 10, wherein the additional data points are samples identified based on an earlier iteration of a stochastic gradient descent operation used to optimize the deep learning.

14. The computer-implemented method of claim 13, wherein the additional data points are identified based on a violation of the arbitrary constraints during the earlier iteration of the stochastic gradient descent operation.

15. The computer-implemented method of claim 9, wherein the original loss function with the penalty loss function are additive terms in the objective function.

16. The computer-implemented method of claim 9, wherein the deep learning model comprises one or more intermediate layers.

17. A computer program product comprising:
   one or more non-transitory computer-readable storage devices and program instructions stored on at least one of the one or more non-transitory storage devices, the program instructions executable by a processor, the program instructions comprising sets of instructions for:
      providing a set of penalty data points enforcing a set of arbitrary constraints in addition to a set of original training data points for a deep learning model;
      assigning a penalty to each penalty data point in the set of penalty data points;
      optimizing the deep learning model by solving an objective function based on an original loss function and a penalty loss function, wherein the original loss function is evaluated over a set of original training data points and the penalty loss function is evaluated over the set of penalty data points; and
      providing the optimized deep learning model based on a solution of the objective function.

18. The computer program product of claim 17, wherein optimizing the deep learning model further comprises maximizing the penalty loss function over additional data points in addition to the set of penalty data points.

19. The computer program product of claim 17, wherein the original loss function with the penalty loss function are additive terms in the objective function.

20. The computer program product of claim 17, wherein the deep learning model comprises one or more intermediate layers.

* * * * *